United States Patent
Friestad et al.

(10) Patent No.: US 9,216,860 B2
(45) Date of Patent: Dec. 22, 2015

(54) BELT TENSIONER FOR A PLANTING UNIT

(71) Applicant: Deere & Company, Moline, IL (US)

(72) Inventors: Michael E. Friestad, Rock Island, IL (US); Robert W. Martin, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 8 days.

(21) Appl. No.: 14/170,376

(22) Filed: Jan. 31, 2014

(65) Prior Publication Data

US 2015/0217943 A1    Aug. 6, 2015

(51) Int. Cl.
B65G 23/44    (2006.01)
A01C 7/12    (2006.01)
A01C 7/20    (2006.01)
F16H 7/12    (2006.01)

(52) U.S. Cl.
CPC ............... *B65G 23/44* (2013.01); *A01C 7/127* (2013.01); *A01C 7/20* (2013.01); *F16H 7/1263* (2013.01)

(58) Field of Classification Search
CPC ...................................................... B65G 23/44
USPC ......................................... 198/813, 814, 816
See application file for complete search history.

(56) References Cited

U.S. PATENT DOCUMENTS

| | | | | |
|---|---|---|---|---|
| 675,196 | A * | 5/1901 | Colahan | 198/814 |
| 3,436,979 | A * | 4/1969 | Molitor | 474/138 |
| 3,921,793 | A * | 11/1975 | Hutchinson et al. | 198/813 |
| 5,197,420 | A | 3/1993 | Arnold et al. | |
| 6,354,203 | B2 * | 3/2002 | Backer et al. | 101/232 |
| 6,607,459 | B1 | 8/2003 | Serkh et al. | |
| 6,997,307 | B2 * | 2/2006 | Iseli | 198/813 |
| 7,101,295 | B2 * | 9/2006 | Taomo et al. | 474/117 |
| 7,419,447 | B2 | 9/2008 | Serkh | |
| 8,469,182 | B2 * | 6/2013 | Alotto | 198/813 |
| 2002/0165056 | A1 | 11/2002 | Ullein | |
| 2012/0067260 | A1 | 3/2012 | Garner et al. | |

* cited by examiner

*Primary Examiner* — William R Harp

(57) ABSTRACT

A belt tensioner assembly is described for a seeding machine that moves seed along a seed path with a seed-transport belt, the seed-transport belt being contained by a belt housing and supported by a fixed belt support. An adjustment mechanism may have an input member accessible from outside the belt housing and a positioning member disposed within the belt housing, the positioning member changing positions in response to user input applied to the input member. A transfer mechanism may be coupled to the positioning member and to a movable belt support, and may move in response to the change in positions of the positioning member. User input to the adjustment mechanism may vary the tension of the seed-transport belt by changing the positioning of the positioning member to move the transfer mechanism and drive the movable belt support along a centerline extending between the fixed and movable belt supports.

19 Claims, 14 Drawing Sheets

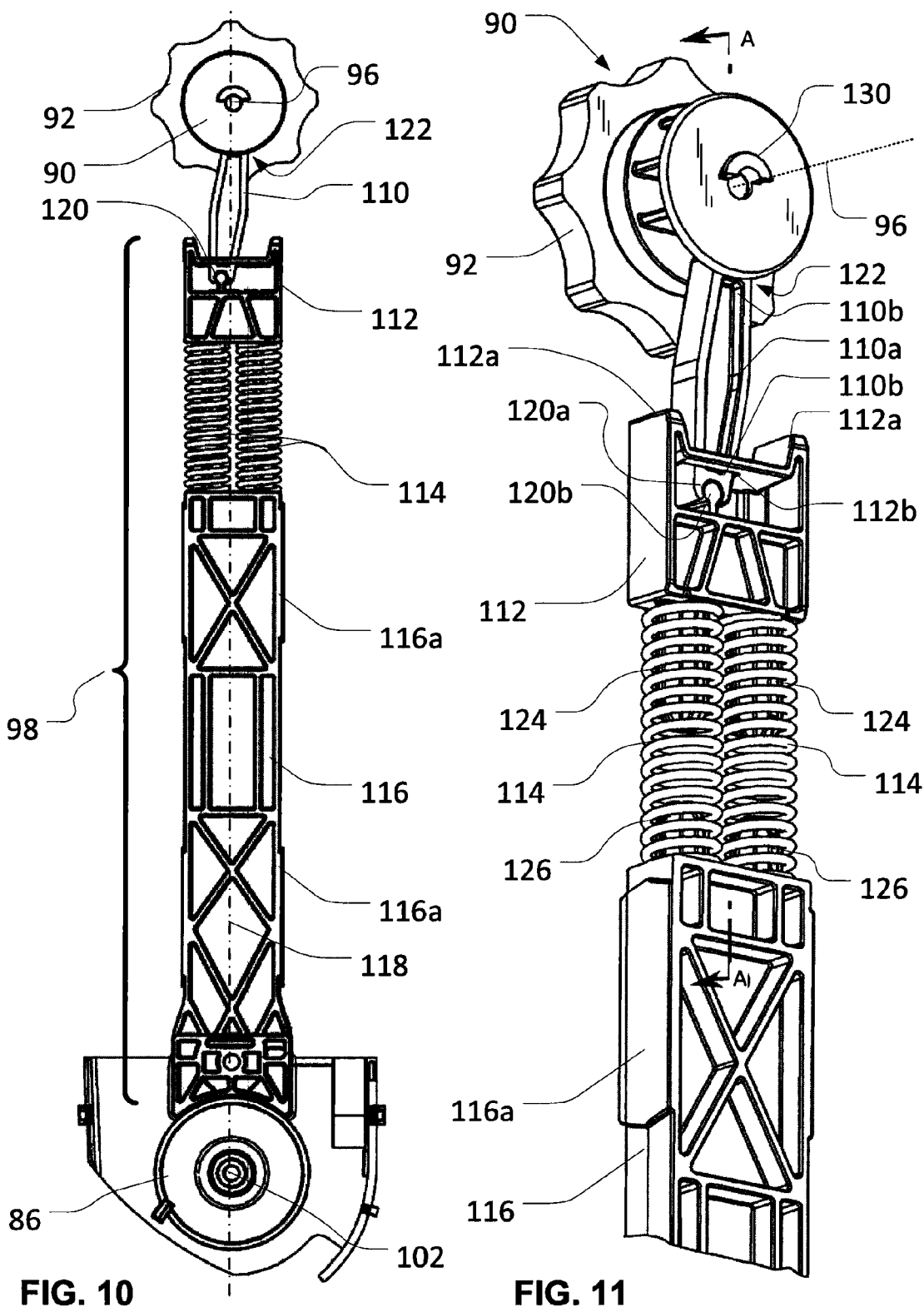

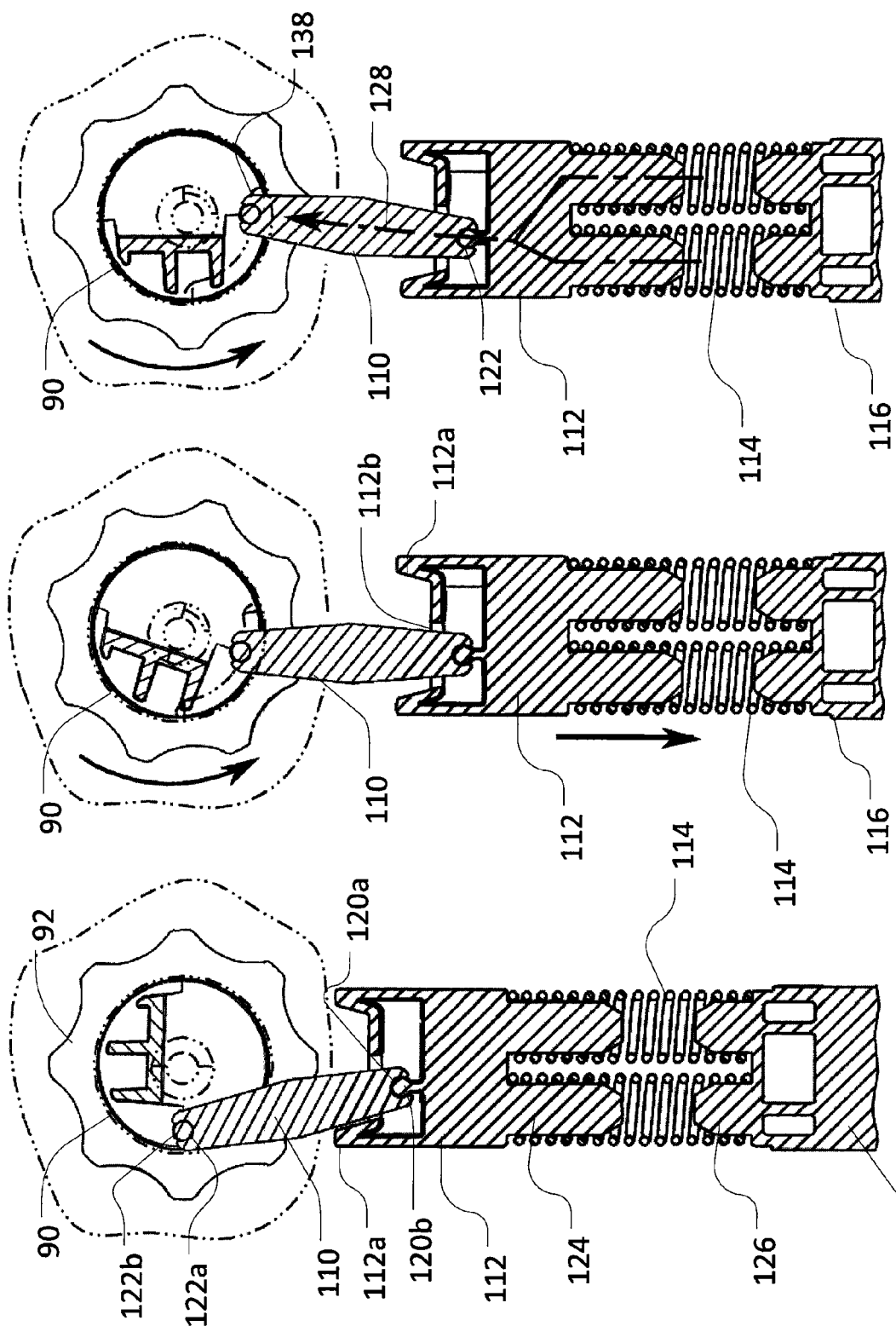

BELT TENSIONER FOR A PLANTING UNIT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

The following relates to planting units for a seeding machine or planter, including planting units having brush belt or other seed-transport systems.

BACKGROUND OF THE DISCLOSURE

In various types of seeding machines (or other mechanisms), seed (or similar material) may be transported by various seed-transport belts or similar transport mechanisms. For example, as depicted in U.S. Patent Publication 2012/0067260, a brush belt of a seed delivery system may receive seed from a seed meter for transport to a planting location. In order for such seed transport mechanisms to operate efficiently, it may be useful to provide for appropriate tensioning of the seed-transport belt (or similar mechanism).

SUMMARY OF THE DISCLOSURE

A belt tensioner assembly is disclosed, for providing tension for a seed-transport (or other) belt during belt operation and for retaining the belt within a housing.

According to one aspect of the disclosure, a seeding machine may be configured to move seed along a seed path with a seed-transport belt, the seed-transport belt being contained by a belt housing and supported by a fixed belt support. An adjustment mechanism may have an input member accessible from outside the belt housing and a positioning member disposed within the belt housing, the positioning member changing positions in response to user input applied to the input member. A transfer mechanism may be coupled to the positioning member and to a movable belt support, and may move in response to the change in positions of the positioning member. User input to the adjustment mechanism may vary the tension of the seed-transport belt by changing the positioning of the positioning member to move the transfer mechanism and drive the movable belt support along a centerline extending between the fixed and movable belt supports.

In certain embodiments, various other features may additionally (or alternatively) be included. The input member may include a hand-crank extending outside of the belt housing, wherein turning the hand-crank may increase the tension of the seed-transport belt. The positioning member may be coupled to the transfer mechanism at an off-center position on the transfer mechanism, with respect to the centerline extending between the fixed and movable belt supports.

In certain embodiments, the transfer mechanism may include a spring assembly with at least one spring, the moving of the transfer mechanism in a first direction via the change in the position of the positioning member compressing the at least one spring to increase the tension of the seed-transport belt. The spring assembly may include a first transfer portion to which the positioning member is coupled and a second transfer portion to which the movable belt support is connected. The first and the second transfer portions may each include a spring mount, the at least one spring extending between the spring mounts to connect the first and the second transfer portions.

In certain embodiments, the belt tensioner assembly may include an internal cover partially covering the adjustment mechanism within the belt housing. An opening in the internal cover may permit the coupling of the transfer mechanism to the adjustment mechanism. A first end of the opening may include an over-center stop, at least one of the transfer mechanism and the adjustment mechanism being urged into the over-center stop when the seed-transport belt is under operational tension.

In certain embodiments, the belt tensioner assembly may include a projection extending from an internal surface of the belt housing toward the transfer mechanism and a complementary recess extending into the transfer mechanism. When the belt housing is closed over the transfer mechanism, the projection may extend into the complementary recess to prevent passage of the transfer mechanism through an opening in the belt housing.

Various other embodiments are contemplated, within the scope of the discussion herein.

BRIEF DESCRIPTION OF THE DRAWINGS

FIG. 10 is a side view of the belt tensioner assembly of FIG. 8;

FIG. 11 is an enlarged partial perspective view of a portion of the belt tensioner assembly of FIG. 8;

FIGS. 13-15 are sectional views of the belt tensioner assembly of FIG. 8, taken along plane A-A of FIG. 11;

Like reference symbols in the various drawings indicate like elements.

DETAILED DESCRIPTION

The following describes one or more example embodiments of the disclosed belt tensioner assembly, as shown in the accompanying figures of the drawings described briefly above. Various modifications to the example embodiments may be contemplated by one of skill in the art.

As also noted above, a brush belt or other belted (or similar) transport mechanism may be used during operation of a planting unit to transport seed between different locations. For example, a brush belt may receive seed individually and sequentially from a seed meter and transport the seed from the metering member to a planting location. In order for such a belted (or similar) mechanism to operate appropriately, it may be useful to place a belt of the mechanism in a state of tension. For example, a belt tensioner assembly may place a belt under tension between two or more pulleys (or similar mechanisms) carrying the belt, thereby assisting in appropriate operation of the belt for seed transport. In certain embodiments, a belt tensioner assembly may be adjustable to release the belt from tension, as may be desirable for replacement or cleaning of the belt, or for other operations.

Figure 1:
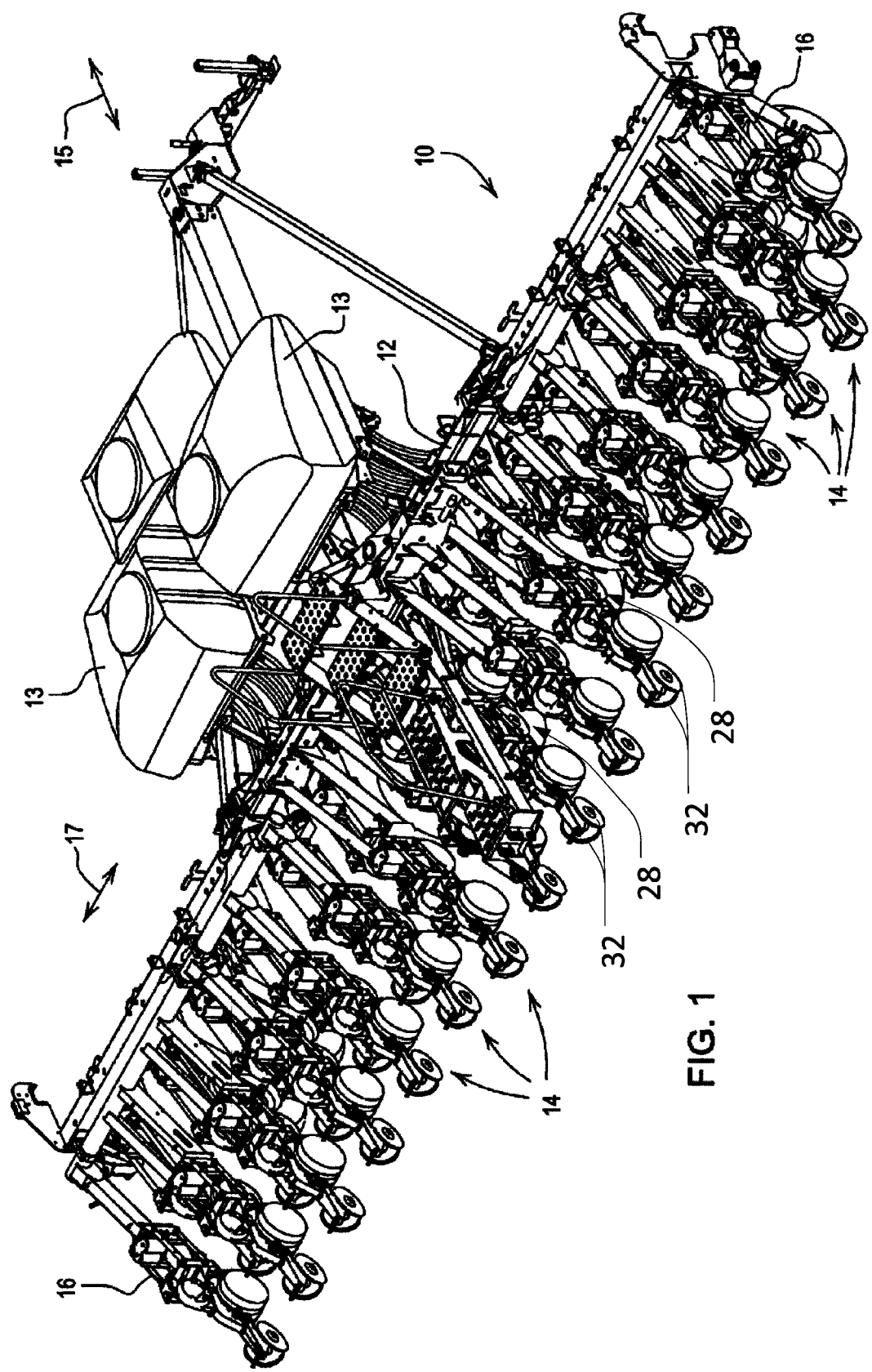
FIG. 1 is a perspective view of a common agricultural planter.

Referring now to FIG. 1, example agricultural seeding machine 10 is shown as a row crop planter. It will be understood that various other configurations may also be possible and that the disclosed seed-double eliminator may be used in a variety of agricultural machinery or other settings. Seeding machine 10 may include central frame 12 on which a plurality of individual planting units 14 may be mounted. Seeding machine 10 may be oriented with a fore-aft direction shown by arrow 15 and a transverse direction shown by arrow 17. Each planting unit 14 may be coupled to central frame 12 by a parallel linkage (e.g. linkage 16) so that individual planting units 14 may move up and down to a limited degree relative to frame 12. Large storage tanks 13 may hold seed that may be delivered pneumatically to a mini-hopper on each planting unit.

Figure 2:
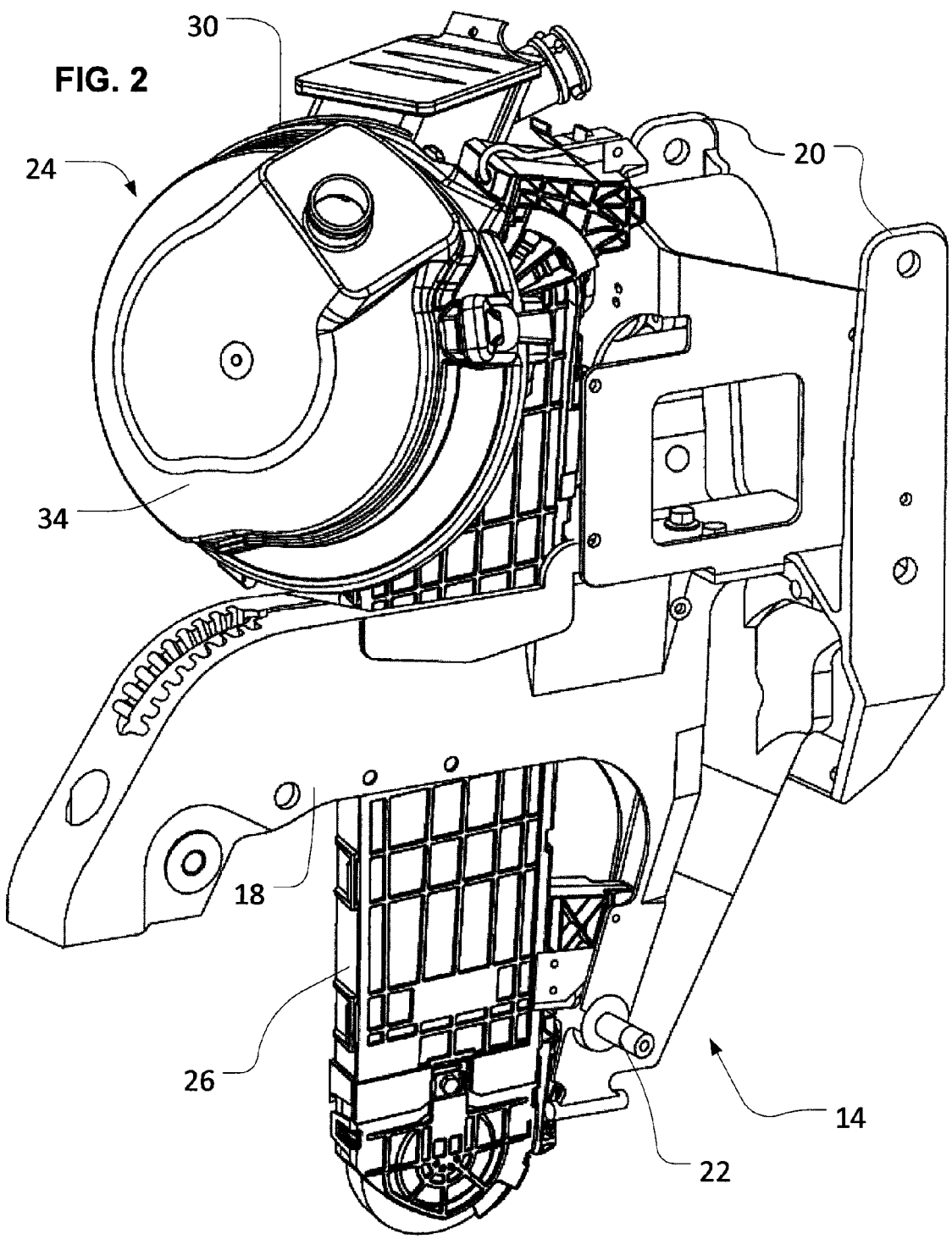
FIG. 2 is a side perspective view of a planting unit frame, seed meter and seed delivery system.

Referring also to FIG. 2, each planting unit 14 may be mounted, in various known ways, to frame member 18. (It will be understood that the disclosed seed-double eliminator may be utilized with planting unit 14, or with various other seed-handling or other devices (not shown).) Frame member 18 may include a pair of upstanding arms 20 at the forward end thereof. Arms 20 may be coupled to the rearward ends of parallel linkage 16. Furrow opening disks 28 (see FIG. 1) may be attached to shaft 22 in a known manner to form an open furrow in the soil beneath the seeding machine into which seed is deposited. Closing and packing wheels 32 (see FIG. 1) may also be mounted to frame member 18 in a known manner to close the furrow over the deposited seed and to firm the soil in the closed furrow. Seed meter 24 and seed delivery system 26 may also be attached to the frame member 18 of the planting unit.

Figure 3:
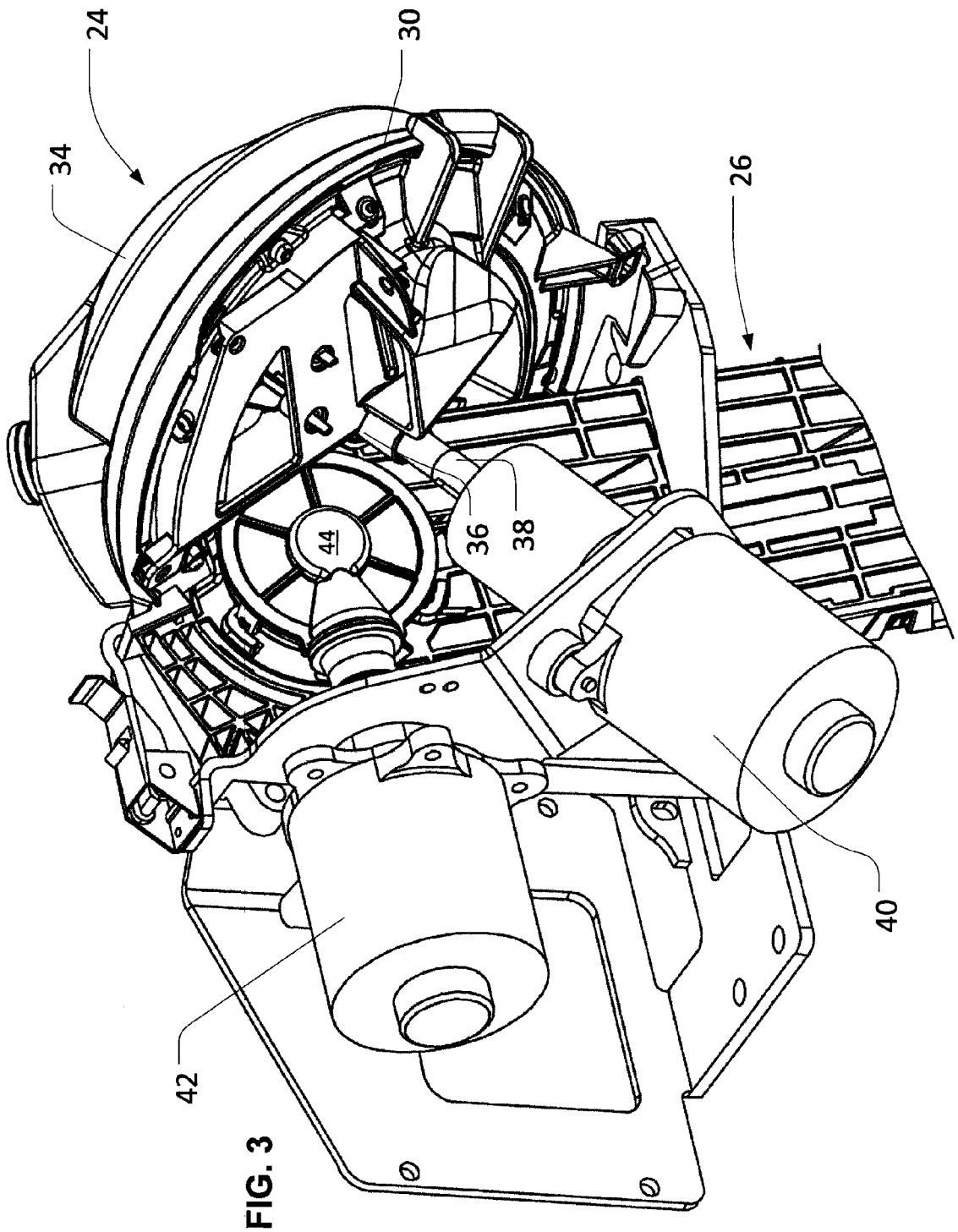
FIG. 3 is an enlarged perspective view of the seed meter and delivery system drives.
Figure 4:
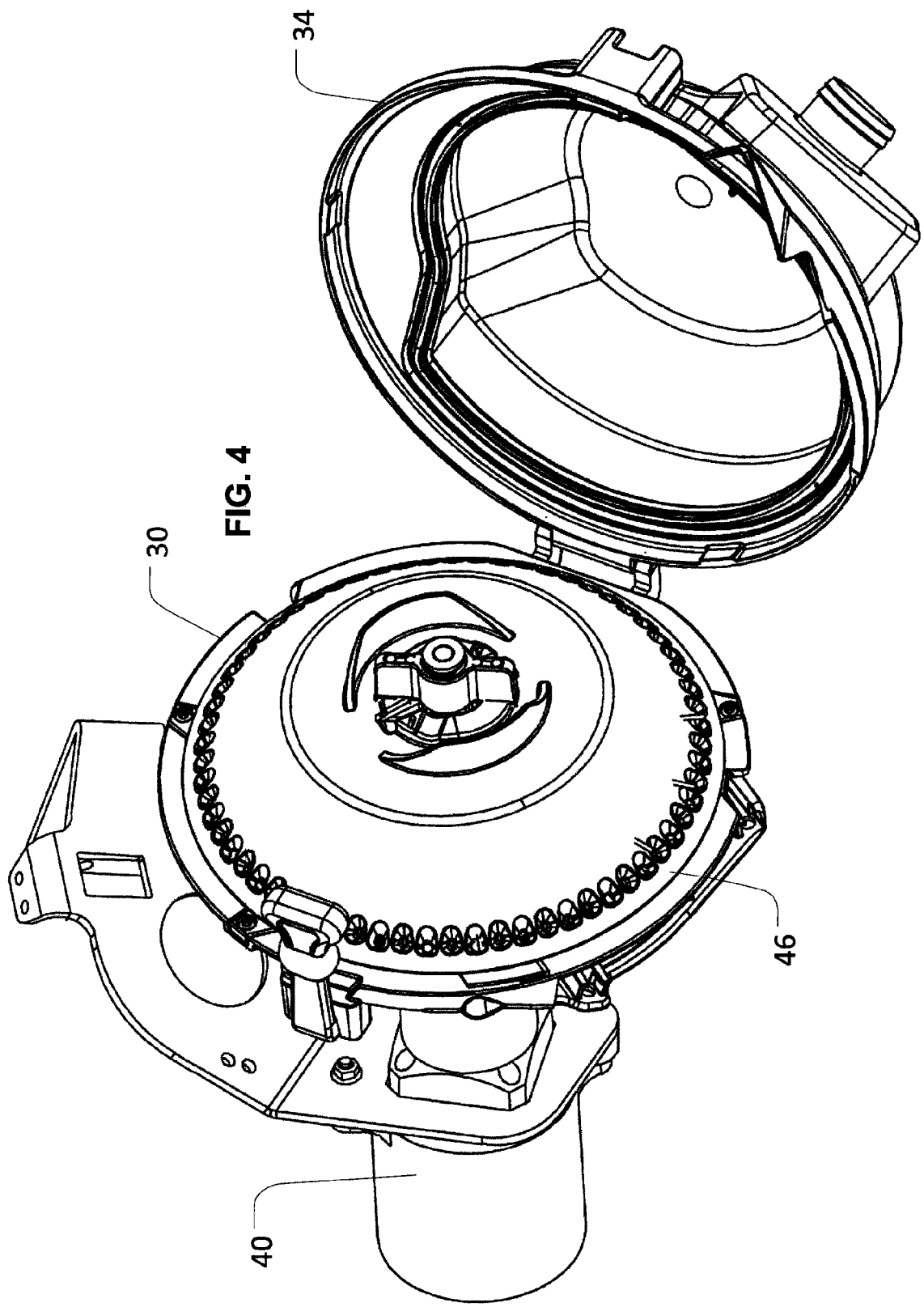
FIG. 4 is a perspective view of the seed meter with the cover open illustrating the metering member.

Referring also to FIGS. 3 and 4, seed meter 24 may include housing 30 and cover 34. Housing 30 and the cover 34 may be coupled to one another by complementary hinge features on housing 30 and cover 34, respectively. Drive spindle 36 may be carried by the housing 30 and may be couple to output shaft 38 of electric motor 40, in order to drive the seed meter when in the assembled position shown in FIG. 3.

Delivery system 26 may be driven by electric motor 42. The output shaft of motor 42 may be connected to delivery system 26 through right-angle drive 44. While electric motors have been shown to drive both the seed meter and the seed delivery system, it will be appreciated by those skilled in the art that other types of motors, (e.g., hydraulic, pneumatic, and so on) can be used as well as various types of mechanical drive systems.

Figure 5:
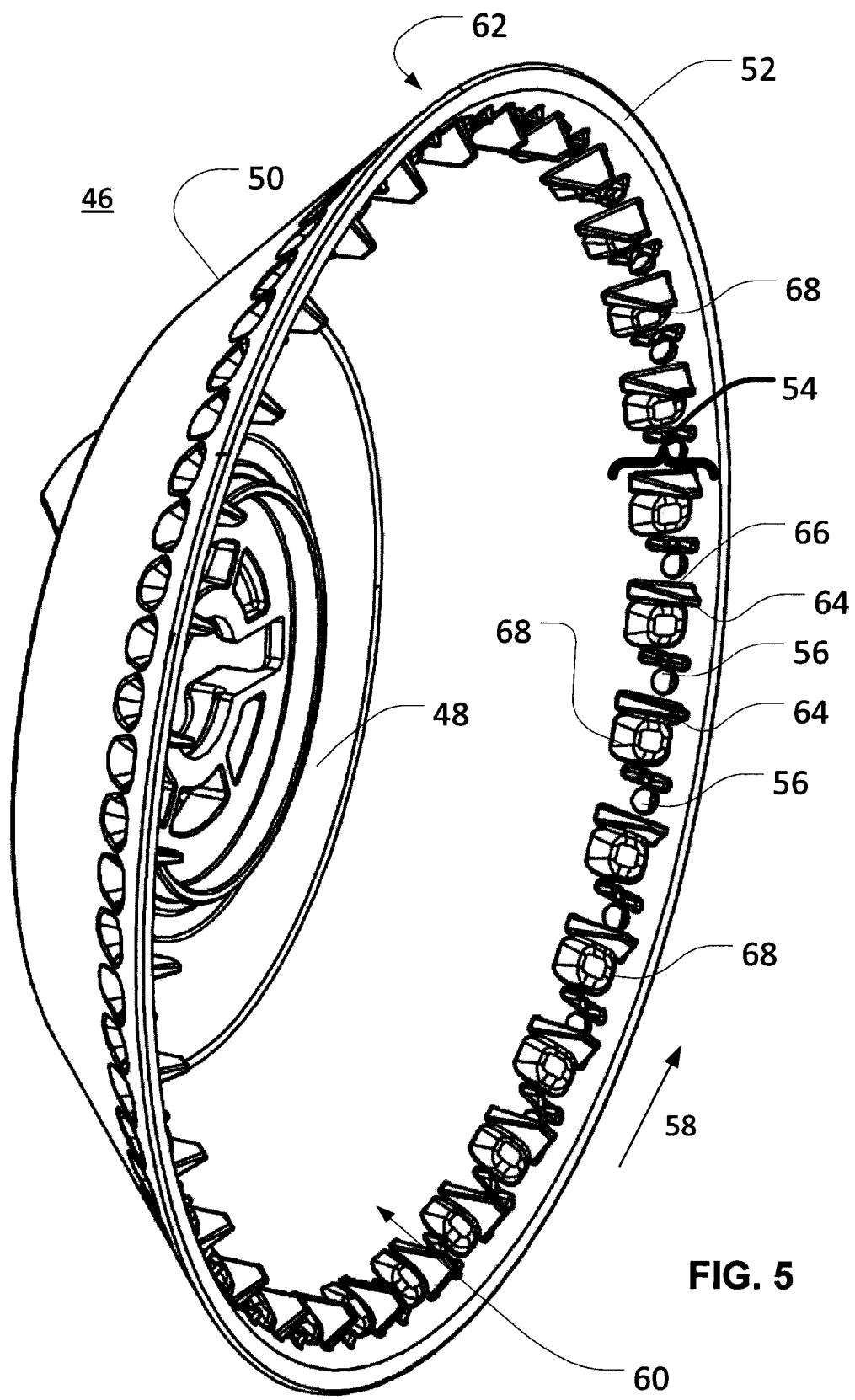
FIG. 5 is a perspective view of a metering member included in the seed meter of FIG. 4.
Figure 6:
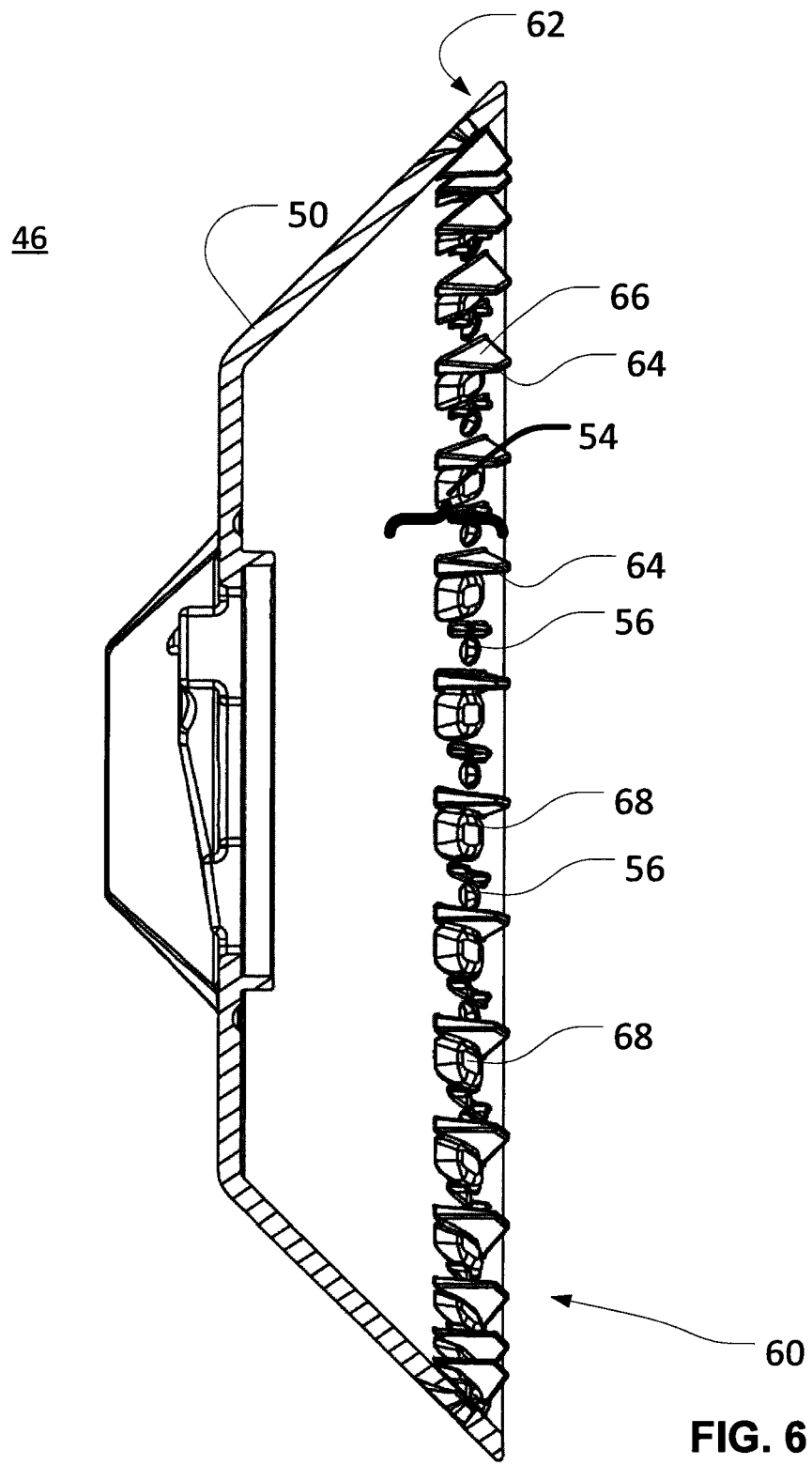
FIG. 6 is side cross-section of the metering member of FIG. 5.

Referring also to FIGS. 5 and 6, example metering member 46 of seed meter 24 is shown in greater detail. Metering member 46 may be (as shown) a concave bowl-shaped body. The bowl-shaped body may have base portion 48 from which side wall 50 extends. Side wall 50 may terminate in outer edge 52. Adjacent outer edge 52, side wall 50 may include rim portion 54, as indicated by bracket in FIGS. 5 and 6, which may extend radially outwardly and axially toward outer edge 52. Within rim portion 54, an annular array of apertures 56 may extend between the inner and outer surfaces of side wall 50.

Metering member 46 may be mounted in meter housing 30 for rotation in the direction of arrow 58 in FIG. 5. In operation, as the metering member rotates, individual seeds from seed pool 60 located at a bottom portion of metering member 46 may adhere to apertures 56 on the inner surface of side wall 50 and thereby be sequentially carried upward to release position 62 at an upper portion of metering member 46. A series of raised features or projections, such as paddles 64, may extend from the inner surface of side wall 50. In certain embodiments, one paddle may be located behind each aperture 56, with respect to direction of rotation 58. Each paddle 64 may, accordingly, form a confronting surface 66 behind the associated aperture in the direction of rotation to push a seed adhered to the aperture into delivery system 26 as described below. In certain embodiments, metering member 46, as installed in housing 30, may be oriented at an angle from vertical (not shown in FIG. 6).

As noted above, seed pool 60 may formed at the bottom of metering member 46. Vacuum may be applied to the outer surface of side wall 50, causing individual seeds to be adhered to various apertures 56 as the apertures travel through the seed pool. As metering member 46 rotates as shown by arrow 58, seed may thereby be moved upward to release position 62 at the upper portion of metering member 46. Release position 62 may be slightly past the top or 12 o'clock position on the circular path of travel of the seed such that the seed is moving somewhat downward at the release position. Seed delivery system 26 may be positioned beneath the upper portion of metering member 46 at the release position 62 to take the seed from the metering member (e.g., as shown in FIG. 7).

Figure 7:
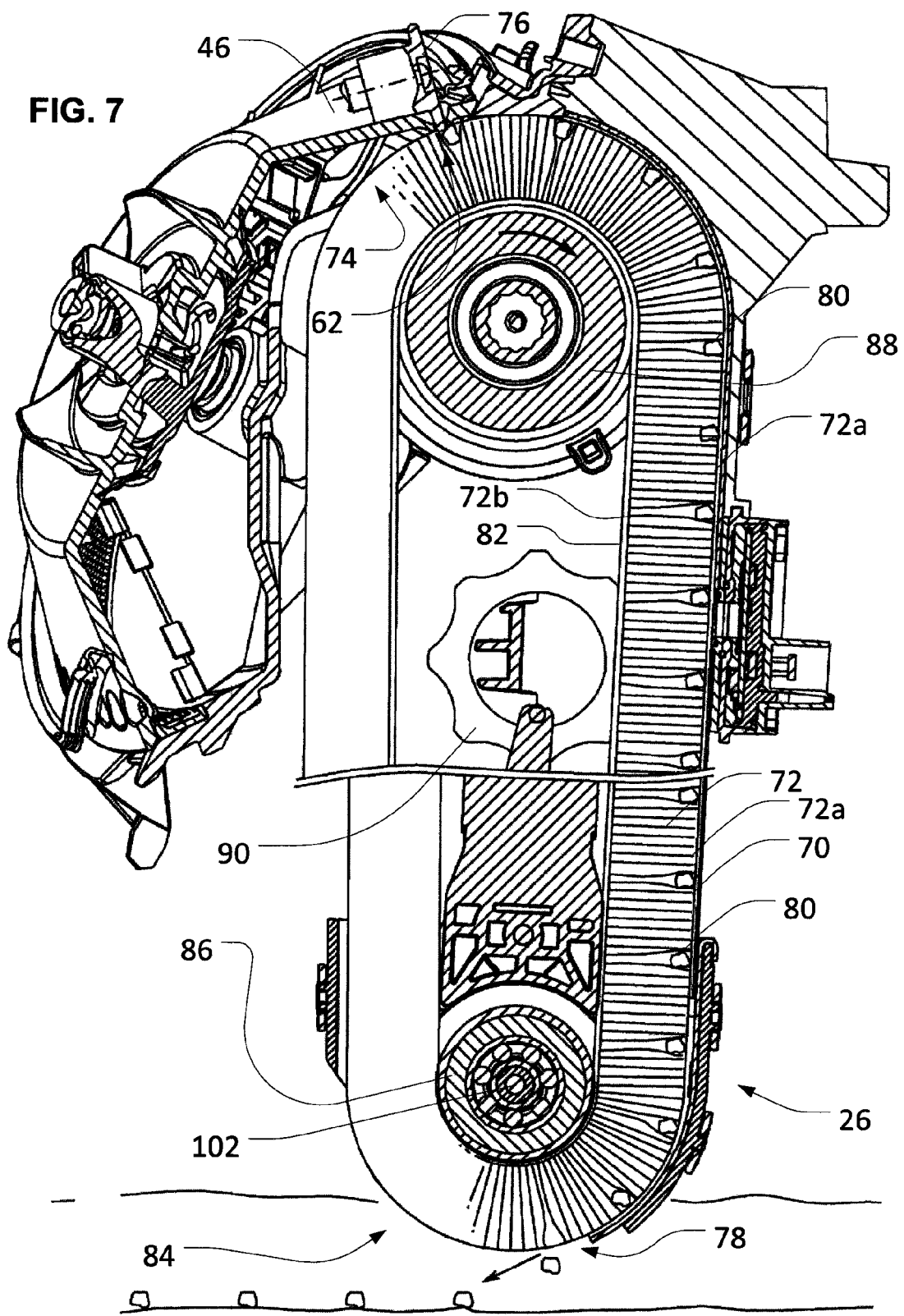
FIG. 7 is a side sectional view of aspects of one embodiment of the seed meter and seed delivery system, including aspects of belt tensioner assembly.

Referring also to FIG. 7, delivery system 26 may include belt housing 70 partially enclosing bristles 72, which may generally travel in a clockwise direction (in FIG. 7) within housing 70. Bristles 72 may include attached ends 72b attached along belt 82, with free ends 72a extending away from attached ends 72b. Belt 82 may be supported by various types of belt supports, such as one or more belt supports that are fixed in place with respect to housing 70 (e.g., that rotate or support rotation around a fixed axis) and one or more belt supports that are movable with respect to housing 70 (e.g., that rotate or support rotation around a movable axis). In certain embodiments, such belt supports may include lower pulley 86 and upper pulley 88 (or similar mechanisms for supporting belt 82). Upper pulley 88, as depicted in FIG. 7, may be a driven pulley (e.g., receiving power from motor 42), whereas lower pulley 86 may be an idler pulley, spinning freely around axis of rotation 102 with the passage of belt 82. Upper opening 74 may be formed in housing 70 in order to allow seed 80 to enter housing 70 (e.g., from metering member 46). Free ends 72a of bristles 72 may extend through opening 74 in order to receive seed from metering member 46. (It will be understood that other configurations may also be possible. For example, delivery system 26 may be oriented horizontally, rather than vertically, or at various angles deviating from horizontal or vertical. As such, in a general sense, pulley 88 may be viewed as a fixed belt support (and not necessarily as an "upper" pulley), pulley 86 may be viewed as a moveable belt support (and not necessarily as a "lower" pulley), opening 74 may be viewed as an inlet opening to delivery system 26 (and not necessarily as a "upper" opening), and opening 84 (as discussed below) may be viewed as an exit opening (and not necessarily as a "lower" opening).)

Ejector 76 may ride on the outer surface of metering member 46, with projections from a star wheel on ejector 76 extending, sequentially, into apertures 56 in order to force seed out of apertures 56. Ejector 76, which may be biased against metering member 46 with a spring (not shown) may, accordingly, "walk" along metering member 46 such that successive projections of the star wheel sequentially eject seeds, at release position 62, from successive apertures 56. These ejected seeds may be captured by free ends 72a of bristles 72 and thereby carried along a path through housing 70 to seed ejection point 78 (as illustrated by various seeds 80 in FIG. 7). At (and downstream of) seed ejection point 78, housing 70 may include opening 84 to allow free ends 72a of bristles 72 to extend outside of housing 70. This opening may provide an exit from housing 70 for seed 80 (i.e., at ejection point 78).

Figures 8, 9:
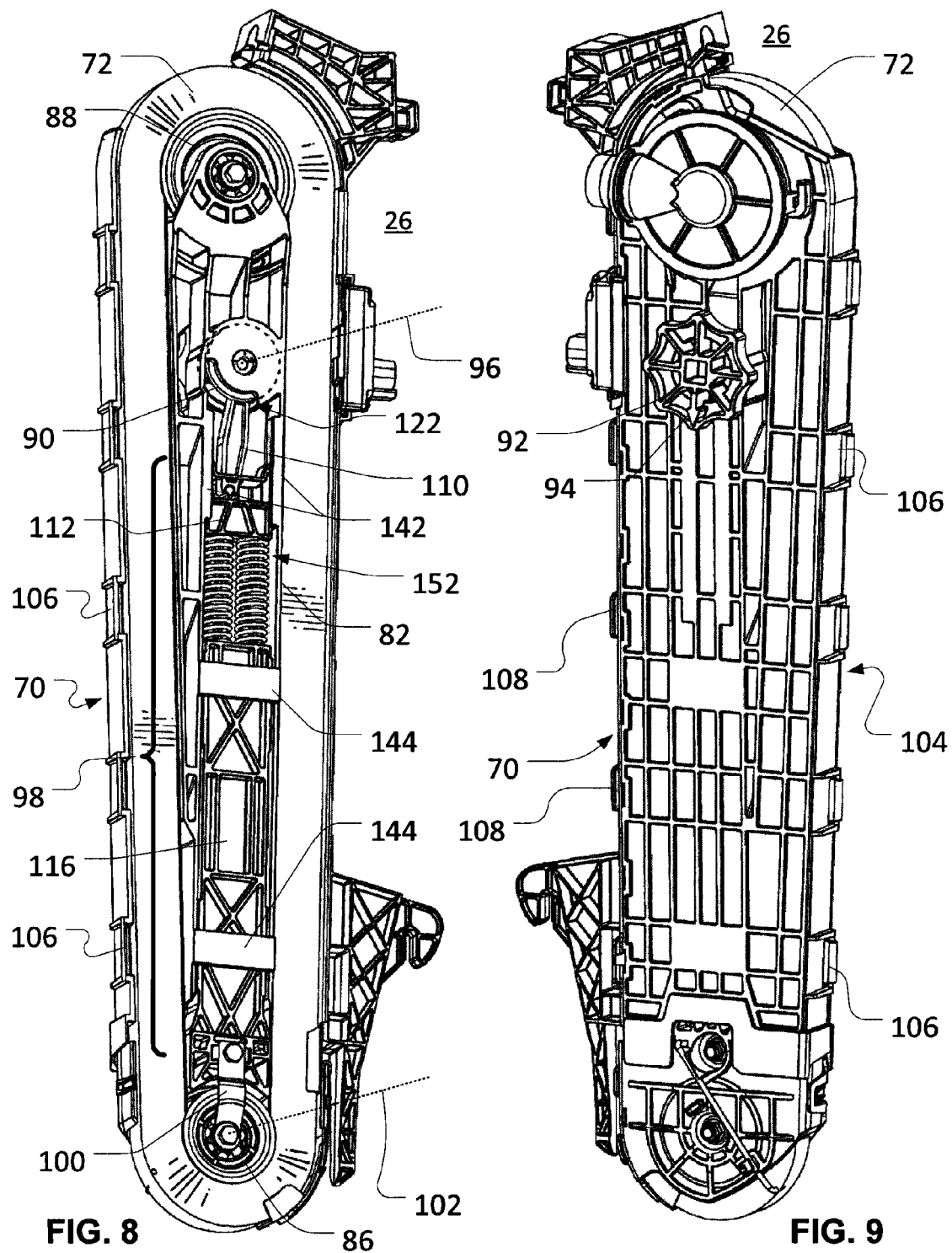
FIG. 8 is a perspective view of the seed delivery system of FIG. 7 with a housing cover removed, the view including the belt tensioner assembly.
FIG. 9 is a perspective view of seed delivery system of FIG. 7, taken from an opposite side of the seed delivery system as in FIG. 8.

Referring also to FIGS. 8 and 9, a belt tensioner assembly may include various components and may generally extend between opposite sides of belt 82 over a portion of the distance between upper pulley 88 and lower pulley 86. (Housing 70 of seed delivery system 26 may include cover 104, which may rotate around hinges 106 and may be secured in a closed configuration by latches 108. In FIG. 8, seed delivery system 26 is depicted with cover 104 removed.) In certain embodiments, a belt tensioner assembly may include an adjustment mechanism, with an input member accessible from outside housing 70 and a positioning member disposed within housing 70. Input to the input member may cause a corresponding change in position of the positioning member, which may be translated to a change in tension on belt 82.

In certain embodiments, for example, an adjustment mechanism may include crank member 90, which may be rotatable around axis of rotation 96 in order to adjust the tension on belt 82. Crank member 90 may be contained, at least in part, by housing 70, with external crank 92 extending outside of housing 70 for easier access by various operators. Within housing 70 connecting link 110 may extend from crank member 90 and may move within housing 70 in response to input to crank member 92. External crank 92 may be configured with a sprocket geometry (as shown), so that it may be manually operated as a hand crank. As described in greater detail below, this may allow an operator to easily increase or decrease tension on belt 82 through manual operation of external crank 92. Other configurations may also be possible, however, including configurations in which external crank 92 is configured to be operated by various tools or automated mechanisms (not shown), rather than directly by hand. In certain embodiments, external crank 92 may include indicator 94, which may provide a visual (or other) indicator of the internal orientation of various components of the disclosed belt tensioner assembly, including the state of tension of belt 82. For example, indicator 94 may indicate the location of connection 122 between connecting link 110 and crank member 90, as shown in FIG. 8, and may, accordingly, indicate whether belt 82 is under operational tension.

A transfer mechanism may be disposed between the adjustment mechanism (e.g., crank member 90) and a movable belt support (e.g., lower pulley 86) and coupled to the positioning member (e.g., connecting link 110). For example, spring assembly 98 may extend between crank member 90 (to which assembly 98 may be connected by connecting link 110) and lower pulley 86 (to which assembly 98 may be connected by mounting bracket 100). In this way, for example, user input to the adjustment mechanism (e.g., user input via external crank 92) may cause movement of the positioning member (e.g., connecting link 110), which may cause a corresponding movement of the transfer mechanism (e.g., spring assembly 98) and of the movable belt support (e.g., pulley 86). This, accordingly, may cause a change in tension on belt 82. For example, if a user turns external crank 92 to move pulley 86 farther away from pulley 88 (via connecting link 110 and spring assembly 98) this may increase the tension on belt 82. Conversely, if a user turns external crank 92 to move pulley 86 closer to pulley 88 this may decrease the tension on belt 82.

In certain embodiments, spring assembly 98 may be configured as one or more sliding members nested within recessed track 152 of housing 70. With one or more portions of spring assembly 98 sliding along recessed track 152 to move pulley 86 with respect to pulley 88. In such a case, for example, features such as retention tabs 142 and cross members 144 may help to secure spring assembly 98 within recessed track 152 while still allowing assembly 98 to slide up and down (as depicted in FIG. 8) within track 152.

Referring also to FIGS. 10 and 11, spring assembly 98 may include various features to provide an appropriate fit within recessed track 152 while avoiding excessive friction between spring assembly 98 and the inner walls of recessed track 152. For example, various projections 116a may be included, which may slide along the inner walls of track 152 in order reduce sideways movement of assembly 98 without excessive frictional resistance to the upward and downward movement of assembly 98.

Figure 12:
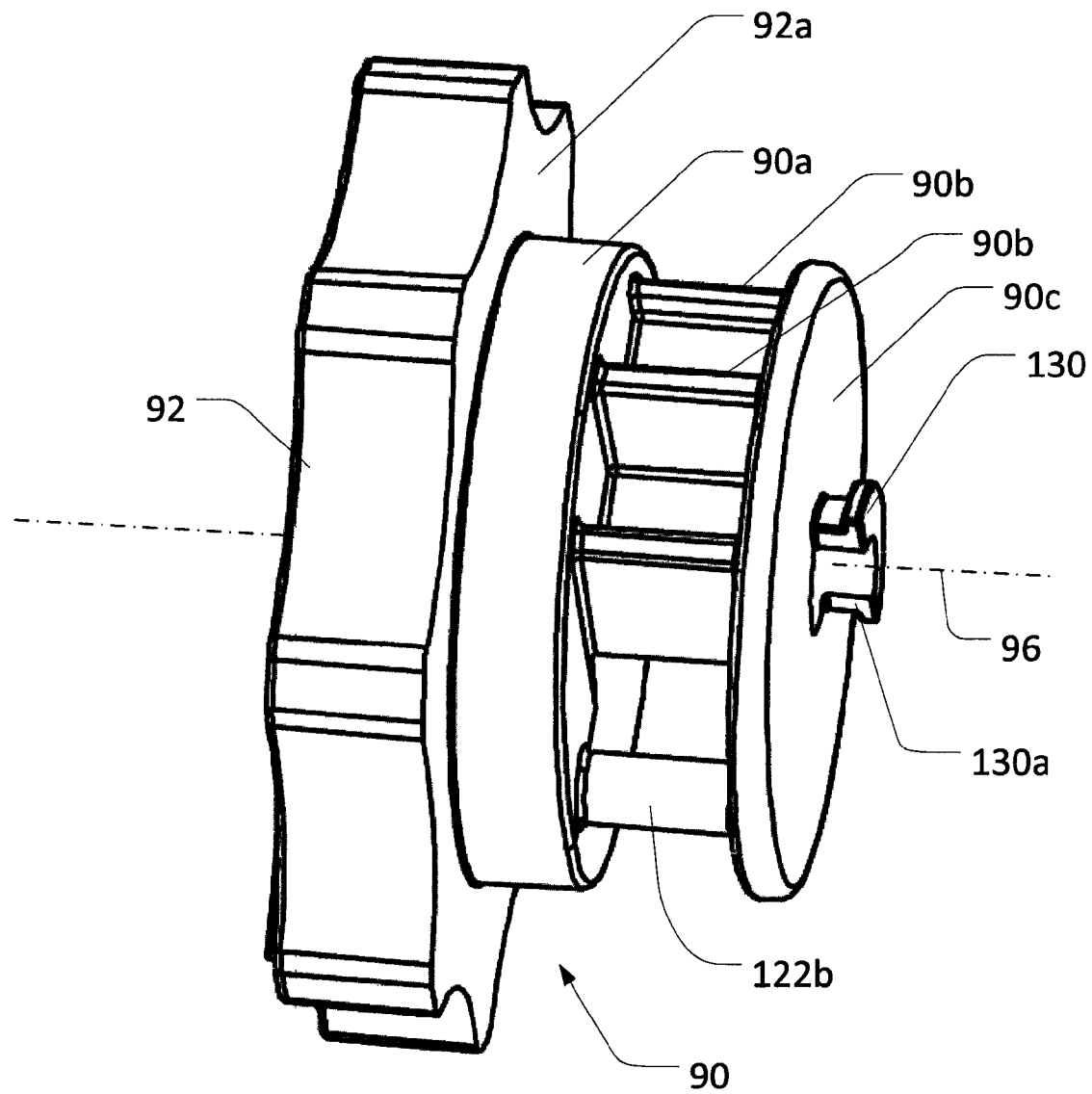
FIG. 12 is a perspective view of a crank member included in the belt tensioner assembly of FIG. 8.

As noted above, a belt tensioner assembly may include crank member 90, which may include external (hand) crank 92. Referring also to FIG. 12, external crank 92 may include inner surface 92a, which may be oriented adjacent to the outer surface of housing 70 when crank member 90 is appropriately installed. Cylinder portion 90a may extend from surface 92a through housing 70. Various ribs 90b, or similar structures, may be provided for structural support, along with post 122b (or other similar features) for connection to connecting link 110. Projection 130 may extend from internal surface 90c, partially surrounding axis of rotation 96 (e.g., as a partial cylinder, as depicted in FIG. 12). In certain embodiments, and as discussed in greater detail below, projection 130 may interact with various features of housing 70 to facilitate installation of crank member 90 without tools, to assist in securing crank member 90 in place with respect to housing 70, and so on.

Still referring to FIGS. 10 and 11, in certain configurations the transfer mechanism (e.g., spring assembly 98) may include multiple distinct portions. For example, spring assembly 98 may include crank-side portion 112 and pulley-side portion 116. One or more springs (e.g., compression springs 114) may extend between crank-side portion 112 and pulley-side portion 116 of spring assembly 98. Because pulley-side portion 116 may support lower pulley 86 (e.g., via mounting bracket 100 (not shown in FIGS. 10 and 11)), springs 124 may accordingly provide a biasing connection between crank member 90 (via connecting link 110 and crank-side portion 112) and pulley 86 (via pulley-side portion 116 and mounting bracket 100). For example, as connecting link 110 moves spring assembly 98 downward (e.g., via appropriate rotation of crank member 90), springs 114 may be compressed and may thereby provide a tensioning force to belt 82 (along with a corresponding, opposite force to connecting link 110).

Springs 114 may be mounted on spring assembly 98 in various ways. In certain embodiments, spring mounts 124 (on crank-side portion 112) and spring mounts 126 (on pulley-side portion 116) may be provided in the form of extended "fingers." Springs 114 may accordingly slide over spring mounts 124 in order to provide a connection between crank member 90 and lower pulley 86. In certain embodiments, other configurations may also be possible. For example, spring-seating recesses (not shown) may be provided on crank-side portion 112 or pulley-side portion 116 of spring assembly 98, into which springs 114 may be inserted in order to connect the two spring-assembly portions 112 and 116.

In certain embodiments, springs 114 may be securely connected to crank-side portion 114 or pulley-side portion 116 of spring assembly 98 when springs 114 are seated on spring mounts 124 or 126, respectively. For example, various catches, pins or other features (not shown) may be provided to fix springs 114 to the various springs mounts 124, 126. In certain embodiments, springs 114 may simply slide over spring mounts 124 or 126, without such catches, pins or other features to fix springs 114 in place. This latter configuration may, for example, provide for simpler manufacture (or assembly) of the various implicated components.

Various portions of spring assembly 98 (e.g., crank-side portion 112 and pulley-side portion 116) may be formed in various ways. As depicted in the various figures, for example, portions 112 and 116 may include generally rectangular post members, with various cross-members, ribs, and so on providing additional structural strength. However, other configurations may also be possible.

In certain embodiments, connecting link 110 may extend between crank member 90 (e.g., at connection 122) and crank-side portion 112 of spring assembly 98 (e.g., at connection 120). Various known mechanisms may be utilized to connect connecting link 110 to crank member 90 and crank-side portion 112 of assembly 98. For example, as depicted in various figures (e.g., FIG. 13), crank member 90 may include post 122b, which may be inserted (e.g., with a snap- or friction-fit connection) into recess 122a on connecting link 110. In this way, connecting link 110 may be secured to crank member 90 and may still rotate to a certain degree around post 122b. Likewise, crank-side portion 112 may include post 120a, which may be inserted (e.g., with a snap- or friction-fit connection) into recess 120a on connecting link 110. In this way, connecting link 110 may be secured to, crank-side portion 112 (and, thereby, spring assembly 98) and may still rotate to a certain degree around post 122a.

In certain embodiments, connecting link 110 may be formed with wider center portion 110a than end portions 110b. In certain configurations, for example, this (or other configurations) may usefully restrict the range of movement of link 110 with respect to crank member 90, crank-side portion 112 of spring assembly 98, or other components. For example, if crank-side portion 112 is configured to include extensions 112a, the taper between center portion 110a and an end portion 110b of link 110 may be selected such that contact between one of extensions 112a and a side of link 110 prevents blocks further motion of link 110 (in the direction of the extension 112a) and thereby prevents further rotation (in the corresponding direction) of crank member 90. Connecting link 110 may additionally (or alternatively) interact similarly with opening 112b in crank-side portion 112 of spring assembly 98, through which link 110 may pass to reach connection 120.

In certain embodiments, connection 120 may be located in an off-center orientation. For example, connecting link 110 may be located off-center on crank-side portion 112, with respect to reference line 118 extending between axis of rotation 96 (of crank member 90) and axis of rotation 102 (of lower pulley 86). As is also discussed below, this may assist in maintaining tension on belt 82 during operation of seed delivery system 26. (It will be understood that reference line 118, may also correspond to the general direction of travel of spring assembly 98 within recessed track 152, and the general direction of travel of pulley 86 as the disclosed belt tensioner assembly is utilized to increase or decrease tension on belt 82. In certain embodiments, reference line 118 may also align with the axes of rotation, respectively, of pulleys 86 and 88.)

In the configuration depicted in the various figures (as well as in various other embodiments), in order to assemble the depicted belt tensioner assembly (e.g., without belt 82 initially in place), crank member 90 may be inserted into housing 70 from the outside of housing 70, with external crank 92 remaining outside of housing 70 (e.g., due to contact between housing 70 and inner surface 92a). Indicator 94 (or other means) may be utilized to ensure that crank member 90 is appropriately aligned. With housing cover 104 open, recess 122a of connecting link 110 may then be snapped onto post 122b of crank member 90. Crank-side portion 112 of spring assembly 98 may also be inserted into housing 70, and recess 120a of connecting link 110 snapped onto post 120b of crank-side portion 112. Springs 114 may be seated on spring mounts 124, and then pulley-side portion 116 of spring assembly 98 (e.g., with pulley 86 already attached via mounting bracket 100) slid into recessed track 152 until springs 114 are also seated on spring mounts 126. Belt 82 may then be mounted onto pulleys 86 and 88, and appropriate belt tension applied (i.e., by appropriately turning external crank 92).

Referring also to FIGS. 13-17, an example operation of the example belt tensioner assembly to apply tension to belt 82 is depicted. For example, for installation, replacement, or servicing of belt 82, crank member 90 may be rotated to the orientation depicted in FIGS. 13 and 17. At such an orientation, spring assembly 98 may apply reduced (including zero) tensioning force to pulley 86, which may result in a slackening of belt 82 (e.g., as can be seen at location 132 in FIG. 17). This may allow for relatively easy removal (or insertion) of belt 82.

From this reduced-tension configuration, in order to operate seed delivery system 26, it may be appropriate to apply an increased tensioning force to pulley 86, thereby increasing the tension on belt 82. Accordingly, once belt 82 is appropriately located with respect to pulleys 86 and 88, an operator may rotate crank member 90 in a counter-clockwise direction (from the perspective of FIGS. 13-17). This may drive connecting link 110 and crank-side portion 112 downward, thereby compressing springs 114, as depicted in FIG. 14. Springs 114 may accordingly provide a downward force to pulley-side portion 116 of assembly 98, which may cause pulley 86 to place belt 82 under increased (operational) tension (i.e., by moving pulley 86 away from pulley 88 along reference line 118 (FIG. 10)). Continuing, as depicted in FIGS. 15 and 16, and described in greater detail below, if crank member 90 is rotated so as to place the system in an over-center configuration, return force 128 provided to crank member 90 by springs 114 may tend to bias the system toward its operational (i.e., increased belt tension) configuration.

Figures 16, 17:
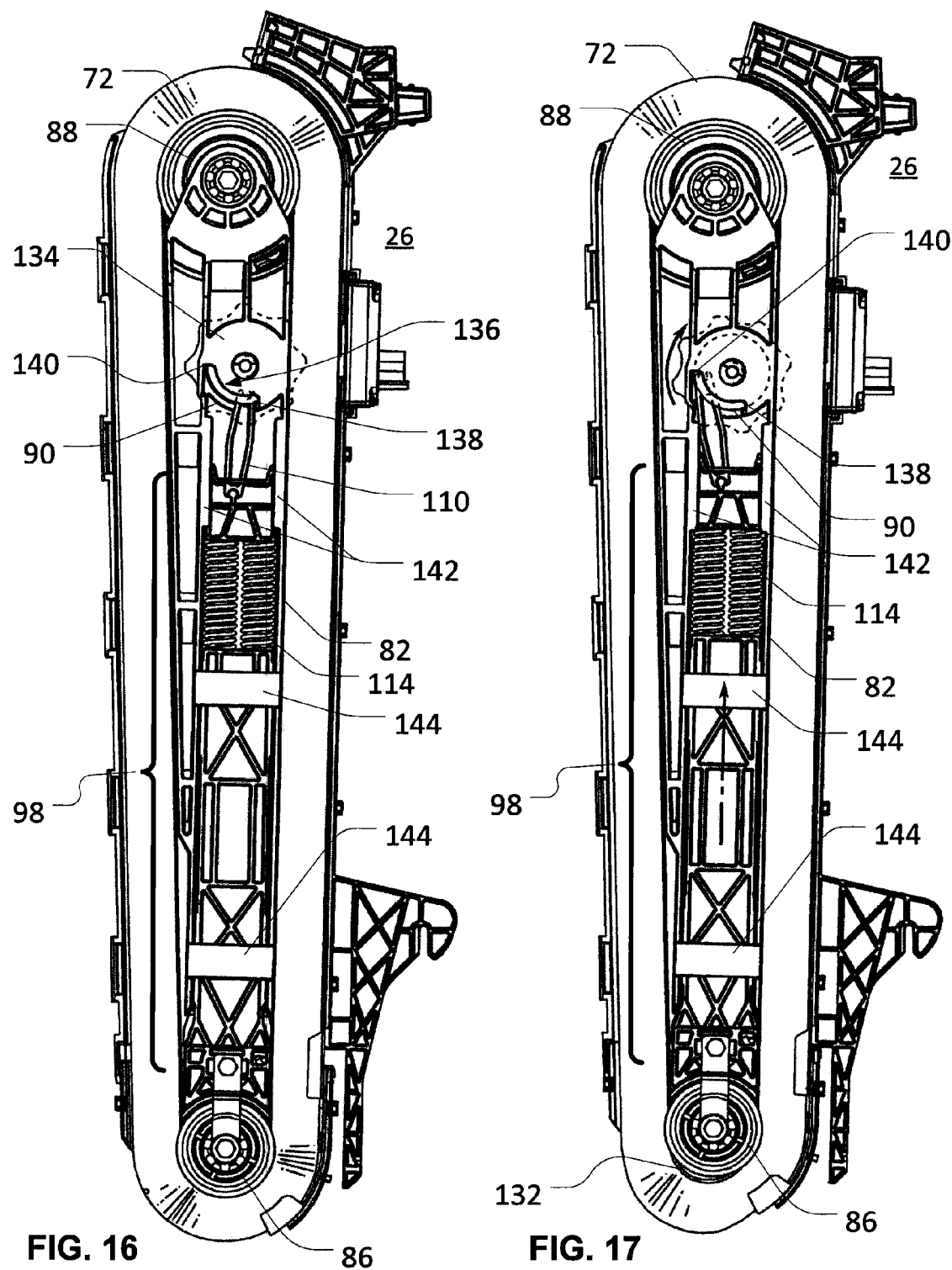
FIG. 16 is a side view of certain internal components of the seed delivery system of FIG. 7, with the belt tensioner assembly of FIG. 8 applying operational tension to a brush belt.
FIG. 17 is a side view of certain internal components of the seed delivery system of FIG. 7, with the belt tensioner assembly of FIG. 8 applying a reduced tension to the brush belt.

Finally, and referring now specifically to FIGS. 16 and 17, in order to return the system from an operational configuration to a reduced tension configuration (e.g., for maintenance on or replacement of belt 82), crank member 90 may be rotated in a clockwise direction, thereby reducing the compression of springs 114 and, accordingly, the tension on belt 82.

Figure 18:
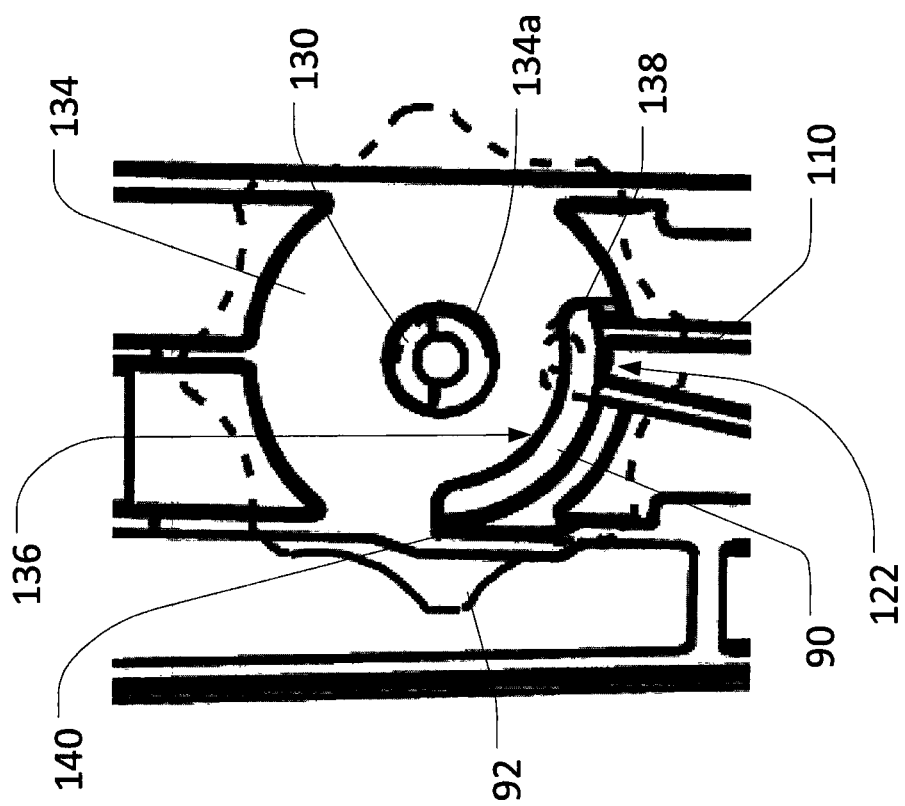
FIG. 18 is an enlarged view of the crank member of the belt tensioner assembly of FIG. 8, with the crank member in the orientation depicted in FIG. 16.

As noted above, in certain embodiments, crank member 90 may be rotated so as to place the tensioner assembly in an over-center configuration. In certain embodiments, an over-center stop may be provided accordingly, in order to help to maintain the system in such an over-center configuration (and, accordingly, to maintain operational tension on belt 82). For example, referring also to FIGS. 18 and 19, crank cover 134 may be provided, which may cover a portion of crank member 90 within housing 70. Crank cover 134 may be configured to appropriately align crank member 90 for operation (e.g., through the insertion of crank projection 130 into bore 134a). Crank cover 134 may additionally (or alternatively) include a crank cover opening 136, which may allow for attachment of connecting link 110 to crank member 90. Crank cover opening 136 may include over-center stop 138 at one end, which may block passage of connecting link 110 when connecting link 110 is in an over-center orientation (with respect to crank member 90 and crank-side portion 112 of spring assembly 98) and thereby prevent further counter-clockwise rotation of crank member 90 (e.g., as depicted in FIG. 18).

In this way, springs 114, connecting link 110 and over-center stop 138 may cooperatively act to bias the example belt tensioner assembly into a higher tension (i.e., operational) configuration. For example, with belt 82 under operational tension (e.g., as in FIGS. 15, 16 and 18), the force provided by springs 114 to pulley 86 (i.e., to provide tension to belt 82) may correspond to equal and opposite return force 128 toward crank member 90. Further, because of the over-center configuration depicted, force 128 may urge connecting link 114 into over-center stop 138. As such, over-center stop 138 may help to prevent reduction in belt tension by preventing continued counter-clockwise rotation of crank member 90 past over-center stop 138. Similarly, return force 128 (via springs 114) may resist reduction in belt tension by resisting any clockwise rotation away from over-center stop 138. As also noted above, the off-center orientation of connection 120 may usefully contribute to this effect, as this orientation may cause return force 128 (as in FIG. 15) to be further directed toward counter-clockwise rotation of crank member 90, thereby further urging connecting link 110 into over-center stop 138 (which may be on the opposite side of reference line 118 (see FIG. 10) from connection 120).

Various other configurations may also be possible. For example, in certain embodiments, an over-center stop (e.g., over-center stop 138) may contact a component other than connecting link 110 in order to prevent further rotation of crank member 90. For example, a projection (not shown) may be provided on crank member 90, which projection may contact over-center stop 138 to prevent further rotation of crank member 90. Similarly, detents, latches, catches, or various other mechanisms may be provided to appropriately stop (or resist) rotation of crank member 90 at various times.

Figure 19:
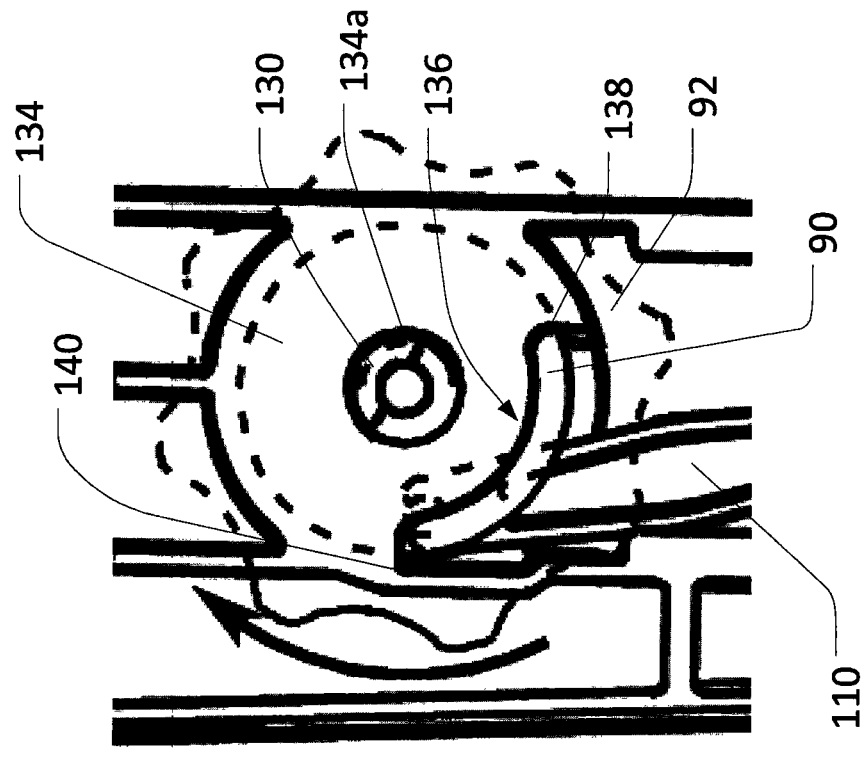
FIG. 19 is an enlarged view of the crank member of the belt tensioner assembly of FIG. 8, with the crank member in the orientation depicted in FIG. 17.

Crank cover opening 136 may also include stop 140, which may prevent further clockwise rotation of crank member 90 (e.g., as depicted in FIG. 19) in various ways. In certain embodiments, for example, stop 140 may include a physical contact point between crank cover 134 and connecting link 110, which may prevent passage of connecting link 110 and thereby prevent further rotation of crank member 90. In certain embodiments, stop 140 may include a reduced clearance between housing 70 and crank member 90, which may itself prevent passage of connecting link 110 (and corresponding clockwise rotation of crank member 90). Various other features may additionally (or alternatively) provide similar functionality. For example, as also noted above, the geometry of connecting link 110 (e.g., the taper between center portion 110a than end portions 110b) may cause link 110 to contact various features (e.g., extensions 112a, opening 112b, the side walls of recessed track 152, and so on) in order to stop (or resist) further rotation of crank member 90 in a particular direction.

Still referring to FIGS. 16 and 17, it will be understood that the contemplated belt tensioning assembly may allow for relatively easy installation (and removal) of various belts 82. For example, with an old belt 82 at elevated (operational) tension, as in FIG. 16, crank member 90 may be rotated clockwise (e.g., via external crank 92) until stop 140 (or another feature) prevents further rotation. As depicted in FIG. 17, this may reduce tension on old belt 82 so as to allow old belt 82 to be removed from pulleys 86 and 88 relatively easily. With crank member 90 still rotated fully clockwise, a new belt 82 may be placed on pulleys 86 and 88, with new belt 82 being under reduced tension due to the configuration of the belt tensioning assembly (as depicted in FIG. 17). Once new belt 82 is in place, crank member 90 may then be rotated counter-clockwise to the over-center configuration depicted in FIG. 16, which may provide appropriate (elevated) operational tension to new belt 82.

As noted above, certain features on crank member 90 may also facilitate relatively simple installation of crank member 90. For example, referring particularly to FIGS. 12-15, crank projection 130 may include projection lip 130a partially surrounding the axis of rotation of crank member 90. Correspondingly, crank cover 134 may include retention lip 154 extending partially around bore 134a. Accordingly, in order to install crank member 90, a user may orient crank member 90 so that projection 130 (and lip 130a) may be inserted through bore 134a past retention lip 154. The user may then rotate crank member 90 to an operational location (e.g., an orientation that allows connecting link 110 to connect to crank member 90 through crank cover opening 136, as depicted in FIGS. 13-15). This rotation may cause projection lip 130a to move into place over retention lip 154, at least in part. Retention lip 154 may accordingly impede withdrawal of projection 130 back through bore 134a, and thereby assist in retaining crank member 90 in its appropriate location within housing 70 (and crank cover 134).

Other features may additionally (or alternatively) be included. For example, as noted above, housing 70 may include lower opening 84, which may allow for seed transported by seed delivery system 26 to be directed into furrows opened by disks 28. In certain configurations, opening 84 may also allow for relatively simple installation of various components of a belt tensioner assembly. (As also noted above, various orientations of delivery system 26 may be possible, including orientations other than the depicted vertical orientation. As such, opening 84 may be generally considered as an exit opening from housing 70, and need not necessarily be a "lower" opening.) If, for example, opening 84 is configured with sufficient width, various components of spring assembly 98 may be slid into recessed track 152 via opening 84. In such a configuration (and others), however, if belt 82 were to break or otherwise fail, various components of spring assembly 98 (as well as lower pulley 86) may tend to slide downward and out of housing 70 through opening 84. This may result in loss of or damage to various of these components.

Figures 20, 21:
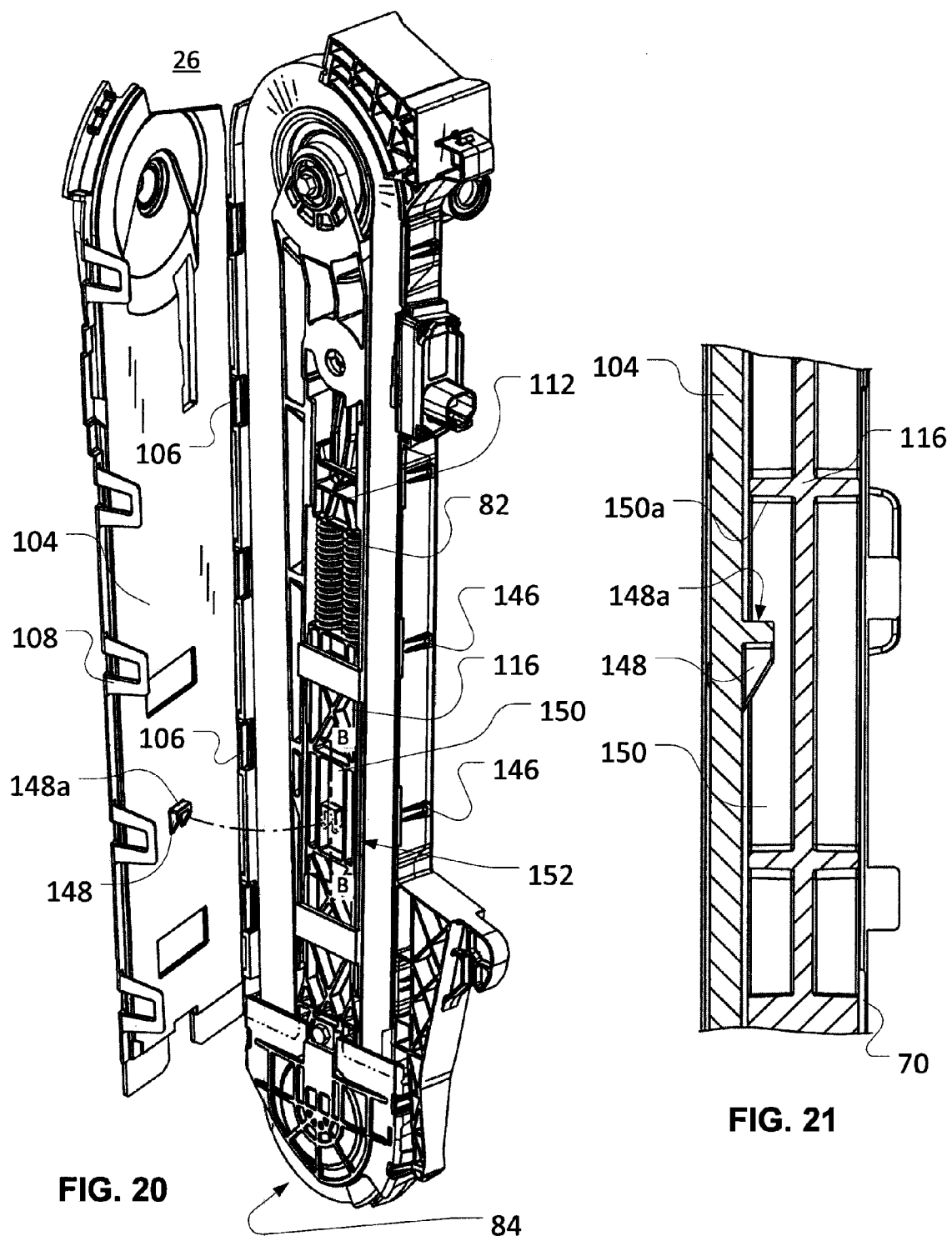
FIG. 20 is a perspective view of the seed delivery system of FIG. 7 with the housing cover open.
FIG. 21 is a sectional view of certain components of the seed delivery system of FIG. 20, taken through plane B-B of FIG. 20 with the housing cover of FIG. 20 closed.

Accordingly, it may be useful to provide various mechanisms in order to prevent spring assembly 98 (or various components thereof) from exiting opening 84 when assembly 98 is not adequately retained by belt 82. Referring to FIGS. 20 and 21, for example, projection 148 may be provided on the inside of housing cover 104 and corresponding recess 150 may be provided on a portion of spring assembly 84 (e.g., on pulley-side portion 116). When cover 104 closed over spring assembly 84, projection 148 may then extend into recess 150, in order to prevent spring assembly 98 (or various components thereof) from exiting opening 84 (even with belt 82 removed).

In certain embodiments, recess 150 may be somewhat larger than projection 148, with projection 148 accordingly preventing movement of spring assembly 84 (or various components thereof) only when spring assembly 84 (or various components thereof) begins to fall through opening 84. As depicted in FIGS. 20 and 21, for example, projection 148 may include upper contact surface 148 and recess 150 may include upper contact surface 150a. During normal operation of seed delivery system 26 (e.g., with belt 82 in operational tension and cover 104 closed), projection 148 may extend into recess 150, but contact surface 148a may not be in contact with contact surface 150a (e.g., as in FIG. 2). In the event of a failure of belt 82, however, pulley-side portion 116 (and other components of spring assembly 98) may begin to slide downward within recessed track 152. Correspondingly, contact surface 150a may slide downward to meet contact surface 148a. This may prevent further downward movement of pulley-side portion 116 and thereby prevent pulley-side portion 116 (as well as pulley 86 and springs 114) from being lost through opening 84.

It will be understood that, in certain configurations, projection 148 and recess 150 (or similar features) may allow spring assembly 98 to pass partially through opening 84, while preventing spring assembly 98 from passing entirely through opening 84. For example, as depicted in FIGS. 20 and 21, if belt 82 were to fail, spring assembly 98 may tend to slide somewhat downward before contact surfaces 148a and 150a prevent further movement of pulley-side portion 116. In certain configurations, this may prevent the complete loss of spring assembly 98 through opening 84, even though part of spring assembly 98 (e.g., a lower section of pulley-side portion 116) may actually pass through opening 84. For example, although pulley 86, mounting bracket 100 and even part of pulley-side portion 116 may extend through opening 84, surfaces 148a and 150a may prevent these components (as well as springs 114, and so on) from passing completely through opening 84. In certain embodiments, such a configuration may provide an operator with a useful visual indicator that an old belt 82 has broken. For example, if old belt 82 has broken, an operator may note that pulley 86, mounting bracket 100, and part of pulley-side portion 116 may visibly extend out of opening 84, while still being held within housing 70 by projection 148. This may usefully indicate to the operator that a new belt 82 may be needed.

In the configuration depicted in the various figures, a similar retention mechanism may not be needed for crank-side portion 112 of spring assembly 98. This may result, for example, from the relatively secure connection between portion 112, connecting link 110, and crank member 90, as well as crank cover 134, which may help to hold crank member 90 within housing 70 even in the event of belt failure. In certain configurations, however, features similar to projection 148 and recess 150 may similarly assist in retaining crank-side portion 112 within housing 70.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

For example, the general orientation of the seed meter and delivery system can differ from that depicted in the figures. In particular, the figures illustrate a generally vertically oriented delivery system. However, the delivery system can instead be generally horizontal or at an arbitrary angle to the horizon. Therefore, any words of orientation, such as various forms of "up", "down", "top", "bottom," "above," and "below", used herein are for the purpose of describing particular embodiments only and are not intended to be limiting of the disclosure.

Accordingly, various embodiments and implementations other than those explicitly described are within the scope of the following claims.

What is claimed is:

1. A belt tensioner assembly for a seeding machine that is configured to move seed along a seed path defined by a seed-transport belt, the seed-transport belt being contained, at least in part, by a belt housing and being supported by a fixed belt support that is fixed with respect to the belt housing, the belt tensioner assembly comprising:
   an adjustment mechanism having an input member accessible from outside the belt housing and having a positioning member disposed within the belt housing, the positioning member changing positions in response to user input applied to the input member;
   a transfer mechanism having a first end coupled to the positioning member and moving in response to the change in positions of the positioning member, wherein the positioning member is coupled to the transfer mechanism at an off-center position on the transfer mechanism, with respect to a centerline of motion of the transfer mechanism; and
   a movable belt support supporting the seed-transport belt, the movable belt support being coupled to a second end of the transfer mechanism and movable with respect to the belt housing;
   wherein user input to the adjustment mechanism changes the position of the positioning member to move the transfer mechanism and drive the movable belt support one of toward or away from the fixed belt support to vary the tension of the seed-transport belt.

2. The belt tensioner assembly of claim 1, wherein the input member includes a hand-crank extending outside of the belt housing; and wherein turning the hand-crank in a first direction drives the movable belt support away from the fixed belt support to increase the tension of the seed-transport belt.

3. The belt tensioner assembly of claim 1, wherein the transfer mechanism includes a spring assembly with at least one spring, the moving of the transfer mechanism in a first direction in response to the change in the position of the positioning member compressing the at least one spring to increase the tension of the seed-transport belt.

4. The belt tensioner assembly of claim 3, wherein the spring assembly includes:

a first transfer portion to which the positioning member is coupled, the first transfer portion including a first spring mount for the at least one spring; and a second transfer portion to which the movable belt support is coupled, the second transfer portion including a second spring mount for the at least one spring; and wherein the at least one spring extends between the first spring mount and the second spring mount to connect the first and second transfer portions of the spring assembly.

5. The belt tensioner assembly of claim 1, further comprising:

a projection extending from at least one of an internal surface of the housing and the transfer mechanism toward another of the at least one of the internal surface of the housing and the transfer mechanism; and a complementary recess extending into at least the other of the at least one of the transfer mechanism and the internal surface of the housing;

wherein the belt housing includes an opening with a width that, when the belt housing is closed over the transfer mechanism, permits passage of part of the transfer mechanism through the opening; and wherein, when the belt housing is closed over the transfer mechanism, the projection extends into the complementary recess in the transfer mechanism to prevent, at least in part, passage of the part of the transfer mechanism through the opening.

6. The belt tensioner assembly of claim 1, further comprising an internal cover partially extending over the adjustment mechanism within the belt housing, the internal cover including an internal-cover opening permitting the coupling of the transfer mechanism to the adjustment mechanism;

wherein a first end of the internal-cover opening forms, at least in part, an over-center stop; and wherein the adjustment mechanism is urged into the over-center stop when the seed-transport belt is under operational tension.

7. The belt tensioner assembly of claim 1, wherein the belt housing includes a recessed track extending, at least in part, between the adjustment mechanism and the movable belt support, the recessed track containing, at least in part, the transfer mechanism.

8. A belt tensioner assembly for a seeding machine that is configured to move seed along a seed path defined by a seed-transport belt, the seed-transport belt being contained, at least in part, by a belt housing and being supported by a fixed belt support that is fixed with respect to the belt housing, the belt tensioner assembly comprising:

a movable belt support supporting the seed-transport belt, the movable belt support being movable with respect to the belt housing;

a transfer mechanism having a first end coupled to the movable belt support, the transfer mechanism being movable within the belt housing;

a projection extending from at least one of an internal surface of the housing and the transfer mechanism toward another of the at least one of the internal surface of the housing and the transfer mechanism; and a complementary recess extending into at least the other of the at least one of the transfer mechanism and the internal surface of the housing;

wherein the belt housing includes an opening with a width that permits passage of part of the transfer mechanism through the opening; and wherein the projection extends into the complementary recess to prevent, at least in part, passage of the part of the transfer mechanism through the opening.

9. The belt tensioner assembly of claim 8, further comprising:

an adjustment mechanism having an input member accessible from outside the belt housing and having a positioning member disposed within the belt housing, the positioning member being coupled to a second end of the transfer mechanism and changing positions in response to user input applied to the input member, the transfer mechanism moving in response to the change in positions of the positioning member;

wherein user input to the adjustment mechanism changes the position of the positioning member to move the transfer mechanism and drive the movable belt support one of toward or away from the fixed belt support to vary the tension of the seed-transport belt.

10. The belt tensioner assembly of claim 9, wherein the input member includes a hand-crank portion extending outside of the belt housing; and wherein turning the hand-crank in a first direction drives the movable belt support to increase the tension of the seed-transport belt.

11. The belt tensioner assembly of claim 9, wherein the positioning member is coupled to the transfer mechanism at an off-center position on the transfer mechanism, with respect to a centerline of motion of the transfer mechanism.

12. The belt tensioner assembly of claim 9, wherein the transfer mechanism includes a spring assembly with at least one spring, the moving of the transfer mechanism in a first direction in response to the change in the position of the positioning member compressing the at least one spring to increase the tension of the seed-transport belt.

13. The belt tensioner assembly of claim 12, wherein the spring assembly includes:

a first transfer portion to which the positioning member is coupled, the first transfer portion including a first spring mount for the at least one spring; and a second transfer portion to which the at least one movable belt support is coupled, the second transfer portion including a second spring mount for the at least one spring; and wherein the at least one spring extends between the first spring mount and the second spring mount to connect the first and second transfer portions of the spring assembly.

14. The belt tensioner assembly of claim 9, further comprising an internal cover partially extending over the adjustment mechanism within the belt housing, the internal cover including an internal-cover opening for coupling the transfer mechanism to the adjustment mechanism;

wherein a first end of the internal-cover opening forms, at least in part, an over-center stop; and wherein the adjustment mechanism is urged into the over-center stop when the seed-transport belt is under operational tension.

15. The belt tensioner assembly of claim 9, wherein the belt housing includes a recessed track extending, at least in part, between the adjustment mechanism and the movable belt support, the recessed track containing, at least in part, the transfer mechanism.

16. A belt tensioner assembly for a seeding machine that is configured to move seed along a seed path defined by a seed-transport belt, the seed-transport belt being contained, at least in part, by a belt housing and being supported by a fixed belt support that is fixed with respect to the belt housing, the belt tensioner assembly comprising:

a movable belt support supporting the seed-transport belt, the movable belt support being coupled movable with respect to the belt housing;

a crank member included, at least in part, within the belt housing, the crank member having a fixed axis of rotation, with respect to the belt housing;

a spring assembly positioned between the crank member and the movable belt support, the spring assembly being connected at a first end to the movable belt support, the spring assembly including at least one spring;

a connecting link connecting the crank member and a second end of the spring assembly; and an over-center stop, the over-center stop being fixed with respect to the belt housing;

wherein, at a first orientation of the crank member, the connecting link and the spring assembly urge the movable belt support to a first distance away from the fixed belt support, the first distance corresponding to a first tension of the seed-transport belt;

wherein, at a second orientation of the crank member, the connecting link and the spring assembly urge the movable belt support to a second distance away from the fixed belt support, the second distance corresponding to a second, elevated tension of the seed-transport belt; and wherein, at the second orientation of the crank member, the at least one spring urges at least one of the connecting link and the crank member into the over-center stop, the over-center stop thereby resisting reduction in the tension of the seed-transport belt by resisting rotation of the crank member.

17. The belt tensioner assembly of claim 16, further comprising:

a projection extending from an internal surface of the belt housing toward the spring assembly; and a complementary recess extending into the spring assembly and away from the internal surface of the belt housing;

wherein the belt housing includes an opening proximate the movable belt support, the opening having a width that permits passage of part of the spring assembly through the opening; and wherein, when the belt housing is closed over the spring assembly, the projection extends into the complementary recess in the spring assembly to prevent, at least in part, passage of the part of the spring assembly through the opening.

18. The belt tensioner assembly of claim 16, further comprising a crank cover partially extending over the crank member within the belt housing, the crank cover including a crank cover opening to permit the connecting of the connecting link to the crank member;

wherein a first end of the crank cover opening forms, at least in part, the over-center stop, the second orientation of the crank member corresponding to the connecting link contacting the first end of the crank cover opening.

19. The belt tensioner assembly of claim 16, wherein the spring assembly includes:

a first portion to which the connecting link is connected, the first portion including a first spring mount for the at least one compression spring; and a second portion to which the movable belt support is connected, the second portion including a second spring mount for the at least one compression spring; and wherein the at least one compression spring extends between the first spring mount and the second spring mount to connect the first and second portions of the spring assembly.

* * * * *